US008247763B2

(12) United States Patent
Izumi et al.

(10) Patent No.: US 8,247,763 B2

(45) Date of Patent: Aug. 21, 2012

(54) ION TRAP TIME-OF-FLIGHT MASS SPECTROMETER

(75) Inventors: Hideaki Izumi, Neyagawa (JP); Kengo Takeshita, Uji (JP); Kiyoshi Ogawa, Nara (JP)

(73) Assignee: Shimadzu Corporation, Kyoto (JP)

( * ) Notice: Subject to any disclaimer, the term of this patent is extended or adjusted under 35 U.S.C. 154(b) by 180 days.

(21) Appl. No.: 12/519,066

(22) PCT Filed: Dec. 12, 2007

(86) PCT No.: PCT/JP2007/001386

§ 371 (c)(1), (2), (4) Date: Jun. 12, 2009

(87) PCT Pub. No.: WO2008/072377

PCT Pub. Date: Jun. 19, 2006

(65) Prior Publication Data

US 2009/0278042 A1 Nov. 12, 2009

(30) Foreign Application Priority Data

Dec. 14, 2006 (JP) ................................ 2006/324907

(51) Int. Cl.
*H01J 49/40* (2006.01)
*H01J 49/42* (2006.01)
*G01N 27/62* (2006.01)

(52) U.S. Cl. ........ 250/287; 250/281; 250/282; 250/286; 250/290; 250/292

(58) Field of Classification Search .................. 250/281, 250/282, 286, 287, 290, 292
See application file for complete search history.

(56) References Cited

U.S. PATENT DOCUMENTS 4,540,884 A * 9/1985 Stafford et al. ............... 250/282
(Continued)

FOREIGN PATENT DOCUMENTS

JP 11-185697 A 7/1999
(Continued)

OTHER PUBLICATIONS

R.E. Mar. and R.J. Hughes, "Quadrupole Storage Mass Spectrometry", John Wiley & Sons, 1989, pp. 31-110.

(Continued)

*Primary Examiner* — David A Vanore

(74) *Attorney, Agent, or Firm* — Sughrue Mion, PLLC

(57) ABSTRACT

The main voltage generator (5) applies a rectangular-wave radio-frequency voltage to the ring electrode (21) in order to capture ions inside the ion trap (2). In the case where the TOFMS (3) is operated in the reflectron mode, the radio-frequency voltage is changed into a constant voltage value when the phase thereof is 1.5π, and a voltage for expelling ions is applied to the end cap electrodes (22, 23) to expel the ions from the exit aperture (25) and introduce them into the TOFMS (3). In this case, since the velocity spread of the ions inside the ion trap (2) is small and so is the spatial spread thereof, a high mass resolution and accuracy can be achieved while assuring a high detection sensitivity. In the case where the TOFMS (3) is operated in the linear mode, the radio-frequency voltage is changed into a constant voltage value when the phase thereof is 0.5π, and then the ions are expelled. In this case, a high mass resolution and mass accuracy can be achieved since the variation of the ions' acceleration, which cannot be converged in the linear mode, can be suppressed.

9 Claims, 3 Drawing Sheets

U.S. PATENT DOCUMENTS

| | | | | | |
|---|---|---|---|---|---|
| 4,736,101 | A * | 4/1988 | Syka et al. | 250/292 |
| 4,990,856 | A * | 2/1991 | Anderson et al. | 324/464 |
| 5,793,038 | A * | 8/1998 | Buttrill, Jr. | 250/282 |
| 6,504,149 | B2 * | 1/2003 | Guevremont et al. | 250/286 |
| 6,812,453 | B2 * | 11/2004 | Bateman et al. | 250/287 |
| 7,045,797 | B2 * | 5/2006 | Sudakov et al. | 250/292 |
| 7,193,207 | B1 | 3/2007 | Ding et al. | |
| 7,285,773 | B2 * | 10/2007 | Ding et al. | 250/282 |
| 7,385,187 | B2 * | 6/2008 | Verentchikov et al. | 250/287 |
| 7,399,958 | B2 * | 7/2008 | Miller et al. | 250/286 |
| 7,586,088 | B2 * | 9/2009 | Bateman et al. | 250/281 |
| 7,683,316 | B2 * | 3/2010 | Takeshita et al. | 250/292 |
| 7,714,284 | B2 * | 5/2010 | Miller et al. | 250/295 |
| 7,897,916 | B2 * | 3/2011 | Sudakov et al. | 250/282 |
| 2004/0132083 | A1 | 7/2004 | Kawato et al. | |
| 2007/0075239 | A1 | 4/2007 | Ding et al. | |
| 2009/0032698 | A1 * | 2/2009 | Furuhashi et al. | 250/282 |
| 2009/0278042 | A1 * | 11/2009 | Izumi et al. | 250/287 |
| 2010/0065740 | A1 * | 3/2010 | Iwamoto et al. | 250/288 |
| 2010/0116982 | A1 * | 5/2010 | Iwamoto et al. | 250/292 |

FOREIGN PATENT DOCUMENTS

| | | | |
|---|---|---|---|
| JP | 2003-512702 | A | 4/2003 |
| JP | 2004-214077 | A | 7/2004 |
| JP | 2006-526876 | A | 11/2006 |
| JP | 2007-524978 | A | 8/2007 |
| WO | 2004/109743 | A2 | 12/2004 |
| WO | 2005/083742 | A2 | 9/2005 |

OTHER PUBLICATIONS

Furuhashi et al., "Development of Digital Ion Trap Mass Spectrometer," Shimadzu Review, Shimadzu Review Editor, Mar. 31, 2006, pp. 141-151, vol. 62, No. 3 4, Abstract.

Written Opinion of the International Searching Authority dated Mar. 25, 2008, issued in corresponding International Application No. PCT/JP2007/001386.

Japanese Office Action dated Mar. 23, 2011, issued in corresponding Japanese Patent Application No. 2008-549203.

* cited by examiner

ION TRAP TIME-OF-FLIGHT MASS SPECTROMETER

TECHNICAL FIELD

The present invention relates to an ion trap time-of-flight mass spectrometer in which an ion trap and a time-of-flight mass spectrometer are combined, where the ion trap confines ions by an electric field, and the time-of-flight mass spectrometer separats and detects ions in accordance with the mass by using the flight time difference.

BACKGROUND ART

A time-of-flight mass spectrometer (which will be called "TOFMS" hereinafter) generally introduces accelerated ions into a flight space where neither electric field nor magnetic field is present, and separates a variety of ions into every mass (mass-to-charge ratio m/z to be exact) in accordance with the flight time for an ion to reach an ion detector. A TOFMS which utilizes an ion trap as the ion source is conventionally known and called an ion trap time-of-flight mass spectrometer (IT-TOFMS).

As illustrated in FIG. 1, a typical ion trap 2 is what is called a three-dimensional quadrupole type, and is composed of a substantially annular ring electrode 21 and a pair of end cap electrodes 22 and 23 provided on both sides of the ring electrode 21. Generally, a radio-frequency voltage is applied to the ring electrode 21 to form a quadrupole electric field in an ion trap space inside the ion trap 2 so that ions are captured and stored by the electric field. In one case, ions are created outside of the ion trap 2 and then introduced into the ion trap 2, while in the other case, ions are created inside the ion trap 2. The theoretical explanation of the ion trap 2 is described in detail in Non-Patent Document 1 or other documents.

In performing a mass analysis with an IT-TOFMS, the application of the radio-frequency voltage to the ring electrode 21 is halted at the point in time when the ions to be analyzed are prepared inside the ion trap 2 by a series of processes as previously described. Almost at the same time with or somewhat later than the halt, a voltage for expelling ions is applied between the pair of end cap electrodes 22 and 23 in order to form an ion-expelling electric field inside the ion trap 2. Ions are accelerated by this electric field, ejected from the ion trap 2 through an exit aperture 25, and introduced into a time-of-flight mass analyzer 3 provided outside of the ion trap 2, to perform a mass analysis.

In the state where ions are captured in the ion trap 2, the ions are repeatedly accelerated and decelerated by the radio-frequency electric field. Therefore, before making the ions exit from the ion trap 2, it is common to gradually diminish the radio-frequency voltage's amplitude in order to decrease the velocity spread of the ions for the sake of the improvement of mass resolution and mass accuracy. However, this weakens the capturing action by the radio-frequency electric field, which results in a spatial spread of the ions. Consequently, the loss of ions in passing through the exit aperture 25 increases, which leads to a decrease of the detection sensitivity in the time-of-flight mass analyzer 3.

Since the aforementioned acceleration and deceleration of the ions in the ion trap 2 are synchronized with the alternation of the ion-capturing radio-frequency electric field, if it is possible to halt the ion-capturing radio-frequency electric field at a phase at which the ions' kinetic energy is minimized, the mass resolution and mass accuracy can be increased without decreasing the detection sensitivity. However, a conventional and general analog ion trap uses an inductance-capacitance (LC) resonator to apply an ion-capturing radio-frequency voltage, and such a circuit has a disadvantage in that it is difficult to quickly halt the voltage application at a desired phase. Given this factor, in the ion trap apparatus described in Patent Document 1, ions are expelled from the ion trap 2 with a relatively small spatial spread of the ions, using a characteristic phenomenon whereby an operation of halting the application of the ion-capturing radio-frequency voltage at a specific phase makes the ring electrode's electric potential to be at a predetermined value after a certain period of time regardless of the immediately preceding amplitude.

In practice, due to the use of a resonator for a voltage generation circuit, the voltage being applied to the ring electrode will remain for some time even after the operation of halting the application of the ion-capturing radio-frequency voltage is performed. Accordingly, the velocity spread of the ions when the ions are expelled might increase, due to the effect of the electric field remaining in the ion trap after the point in time when the operation of halting the application of the ion-capturing radio-frequency voltage is performed and before ions are actually expelled from the ion trap. This might decrease the mass resolution and mass accuracy.

In the meantime, digital ion traps in which a rectangular-wave radio-frequency voltage is applied to the ring electrode have recently been developed (refer to Patent Document 2, Non-Patent Document 2 and other documents for example) as an alternative to the previously described analog ion trap using a resonator. In a digital ion trap, it is possible to perform the mass selection of an ion to be stored, by changing the wavelength of the rectangular-wave radio-frequency voltage while maintaining its amplitude. In a voltage generation circuit of such a digital ion trap, a rectangular-wave voltage is generated by changing, with switches, a direct current voltage generated in a direct current power source as described in Patent Document 2 for example. According to this method, it is possible, in principle, to halt the application of voltage at a desired timing.

[Patent Document 1] Japanese Unexamined Patent Application Publication No. 2004-214077

[Patent Document 2] Japanese Unexamined Patent Application Publication No. 2003-512702

[Non-Patent Document 1] R. E. March and R. J. Hughes, *Quadrupole Storage Mass Spectrometry*, John Wiley & Sons, 1989, pp. 31-110.

[Non-Patent Document 2] Furuhashi et al., "Development of Digital Ion Trap Mass Spectrometer," *Shimadzu Review*, Shimadzu Review Editor, vol. 62, no. 3-4, pp. 141-151, Mar. 31, 2006.

DISCLOSURE OF THE INVENTION

Problems to be Solved by the Invention

In a mass spectrometer using the digital ion trap described in the aforementioned document, the ions having a specific mass among the captured ions are only selectively resonated in order to be expelled from the ion trap and mass analyzed. However, the digital ion trap has not been used as an ion source of a TOFMS, and an appropriate voltage control for collectively expelling ions stored in the ion trap and introducing them into the TOFMS has not been conventionally known.

The present invention has been created to solve the aforementioned problems, and the objective thereof is to provide an ion trap time-of-flight mass spectrometer capable of performing a mass analysis with higher levels of mass resolution and mass accuracy than ever before, or a mass analysis with higher levels of sensitivity than ever before.

Another objective of the present invention is to provide an ion trap time-of-flight mass spectrometer capable of performing either a mass analysis placing a significance on the mass resolution and mass accuracy or a mass analysis placing a significance on the detection sensitivity in accordance with the purpose of analysis and other factors.

Means for Solving the Problems

The present invention developed to solve the aforementioned problems provides an ion trap time-of-flight mass spectrometer including an ion trap for capturing ions by an ion-capturing electric field formed in the space surrounded by a plurality of electrodes and a time-of-flight mass analyzer for the mass separation and detection of ions which have been expelled from the ion trap, including:

a) a main voltage generator for applying a rectangular-wave radio-frequency voltage to at least one electrode among the plurality of electrodes in order to form the ion-capturing electric field;

b) an auxiliary voltage generator for applying a voltage to at least one electrode, other than the aforementioned one electrode, among the plurality of electrodes in order to expel ions from the ion trap; and c) a controller for controlling the main voltage generator in such a manner as to change the voltage into a constant voltage value at a timing when the rectangular-wave radio-frequency voltage is at a predetermined phase, and for controlling the auxiliary voltage generator in such a manner as to apply a voltage for expelling ions simultaneously with or later than the timing, in order to collectively expel ions in the state where the ions are captured in the ion trap by the ion-capturing electric field.

In a preferable embodiment of the ion trap time-of-flight mass spectrometer according to the present invention, the timing, i.e. the phase, at which the rectangular-wave radio-frequency voltage is changed into the constant voltage value can be selected continuously or from a plurality of steps.

For example, the main voltage generator can create and provide an intended rectangular-wave radio-frequency voltage by changing a plurality of direct current voltages using a rectangular-wave signal as a control signal obtained by dividing a rectangular-wave signal of a higher frequency. In this case, the radio-frequency voltage's frequency can be changed by varying the frequency-dividing ratio, or varying the frequency of the reference rectangular-wave signal by a voltage-controlled oscillator or similar device. Furthernore, the phase at which a rectangular-wave radio-frequency voltage is changed into a constant voltage value can be changed by varying the timing of the reset (or set) of the dividing circuit or changing the configuration of the circuit for performing logical operations on the output the dividing counter in the dividing circuit.

The behavior of the ions captured in the ion trap is synchronized with the phase of the rectangular-wave radio-frequency voltage. That is, the kinetic energy of an ion influenced by the ion-capturing electric field fluctuates in synchronization with the phase of radio-frequency voltage, and the position of an ion within the trap space (e.g. distance from the center point) also fluctuates in synchronization with the phase of the radio-frequency voltage. In order to enhance the mass resolution and mass accuracy in the time-of-flight mass analyzer, the variation of flight times for the same ion species should preferably be small. Therefore, it is preferable that the predetermined phase can be set to a phase at which the velocity spread of the ions in the ion trap least influences the spread of flight times in the time-of-flight mass analyzer.

In order to enhance the detection sensitivity in the time-of-flight mass analyzer, it is preferable that as many ions as possible are introduced into the time-of-flight mass analyzer, which requires the reduction of the loss when ions are expelled from the ion trap. Given this factor, it is preferable that the predetermined phase can be set to a phase at which the spatial spread of the ions at the moment of expelling the ions from the ion trap is minimized.

A typical ion trap is composed of: a ring electrode to which the rectangular-wave radio-frequency voltage for capturing ions is applied; and a pair of end cap electrodes to which the voltage for expelling ions is applied, being placed across the ring electrode. In this configuration, the aforementioned conditions are satisfied when the duty ratio of the rectangular-wave radio-frequency voltage is 50% and the predetermined phase is $1.5\pi$. It should be noted that the phase does not have to be strictly $1.5\pi$ but may be a value adjacent thereto.

On the other hand, on the phase condition as just described, the spatial spread of the ions in the direction in which the ions are expelled from the ion trap becomes large and the variation of the acceleration condition becomes large. Hence, it is necessary to use a reflectron time-of-flight mass spectrometer in order to alleviate the influences of such variations.

In the case where such a configuration is not possible, for example if a linear time-of-flight mass spectrometer is used, it is preferable that the predetermined phase can be set to a phase at which the velocity spread of the ions, which is generated due to the spatial spread of the ions in the ion trap when the ions are accelerated to be introduced into the time-of-flight mass analyzer, is minimized. In an ion trap composed of one ring electrode and a pair of end cap electrodes, when the duty ratio of the rectangular-wave radio-frequency voltage is 50%, the phase that satisfies such conditions is $0.57\pi$.

As just described, the preferable phase for expelling ions changes according to whether the time-of-flight mass analyzer is a linear type or a reflectron type. Therefore, in the case where the operation mode can switch between a linear mode and a reflectron mode, it is preferable that the predetermined phase can be changed in accordance with the switching of the operation mode. This changing of the phase may be manually performed by an operator. Alternatively, or additionally, the phase at which the ions are expelled may be automatically changed interlocking with the switching of the operation mode between the linear mode and the reflectron mode.

In the case where the ion trap is composed of: a ring electrode to which the rectangular-wave radio-frequency voltage for capturing ions is applied; and a pair of end cap electrodes to which the voltage for expelling ions is applied, being placed across the ring electrode, it is preferable that the duty ratio of the rectangular-wave radio-frequency voltage be 50%, the predetermined phase is $1.5\pi$ when the operation mode is the reflectron mode, and the predetermined phase is $0.5\pi$ when the operation mode is the linear mode.

Effects of the Invention

The ion trap time-of-flight mass spectrometer according to the present invention is capable of differently performing the mass analysis according to the purpose of the analysis, the kind of a sample to be analyzed, the analysis conditions and other factors: For example, the mass analysis may be performed with a high mass resolution and high mass accuracy while maintaining a high detection sensitivity. Alternatively, the analysis may be performed with an even higher mass resolution and mass accuracy if it is particularly important to improve these properties. In the case where the time-of-flight mass analyzer is capable of changing its operation mode between the linear mode and reflectron mode, a high mass resolution and mass accuracy can be achieved in either operation mode.

EXPLANATION OF NUMERALS

1 . . . Ionization Unit
2 . . . Ion Trap
21 . . . Ring Electrode
22 . . . Entrance Side End Cap Electrode
23 . . . Exit Side End Cap Electrode
24 . . . Injection Aperture
25 . . . Exit Aperture
3 . . . Time-of-Flight Mass Analyzer
31 . . . Flight Space
32 . . . Reflectron
33 . . . First Detector
34 . . . Second Detector
5 . . . Main Voltage Generator
50 . . . Clock Generator
51 . . . Phase Control Circuit
52, 53, 54 . . . Counting Circuit
55, 56, 57 . . . Voltage Source
58, 59, 60 . . . Switch
6 . . . Auxiliary Voltage Generator
7 . . . Controller
8 . . . Operation Unit

BEST MODE FOR CARRYING OUT THE INVENTION

Figure 1:
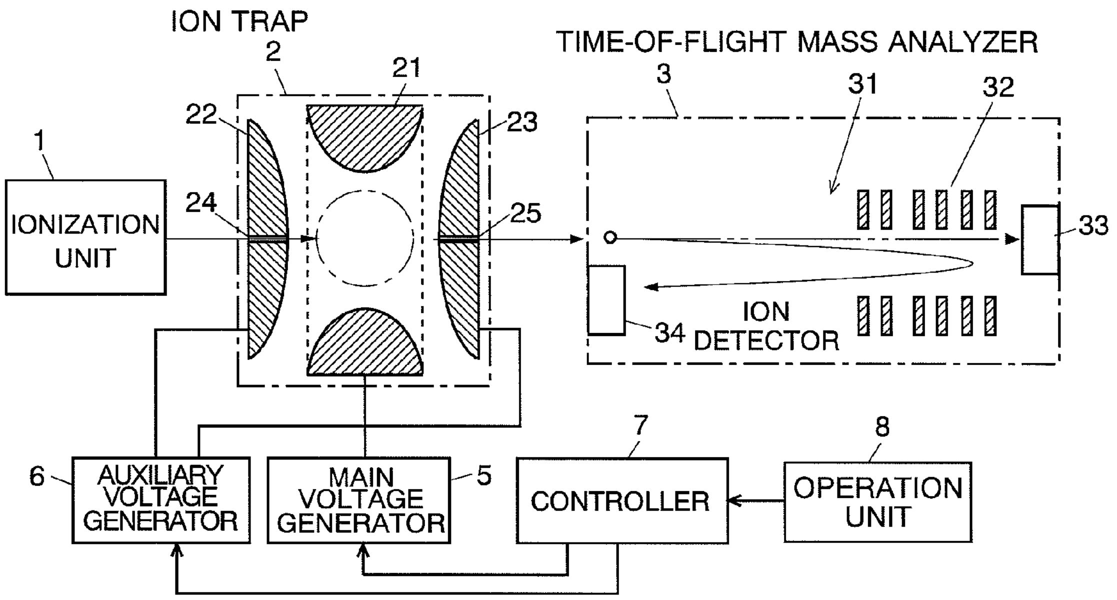
FIG. 1 is an overall configuration diagram of an ion trap time-of-flight mass spectrometer according to an embodiment of the present invention.

Hereinafter, an ion trap time-of-flight mass spectrometer (IT-TOFMS) according to an embodiment of the present invention will be explained in detail regarding its configuration and operation. FIG. 1 is an overall configuration diagram of the IT-TOFMS of the present embodiment.

An ion trap 2 includes one ring electrode 21 and a pair of end cap electrodes 22 and 23. A main voltage generator 5 is connected to the ring electrode 21, and an auxiliary voltage generator 6 is connected to the end cap electrodes 22 and 23. An ionization unit 1 is provided outside an injection aperture 24, which is bored approximately in the center of the entrance side end cap electrode 22. Ions generated in the ionization unit 1 are introduced through the injection aperture 24 into the ion trap 2. A time-of-flight mass analyzer 3 is provided outside an exit aperture 25, which is formed in the exit side end cap electrode 23 and approximately aligned with the injection aperture 24.

The time-of-flight mass analyzer 3 includes: a flight space 31 for allowing ions to fly; a reflectron 32 for returning the ions by an electric field; a first detector 33 for detecting ions that have proceeded forthright in the flight space 31; and a second detector 34 for detecting ions that have been returned by the reflectron 32 and flown therein. That is, this time-of-flight mass analyzer 3 can change the operation mode between the linear mode and reflectron mode, each of which can be selected to perform an analysis according to the kind of sample and the purpose of the analysis.

Figure 2:
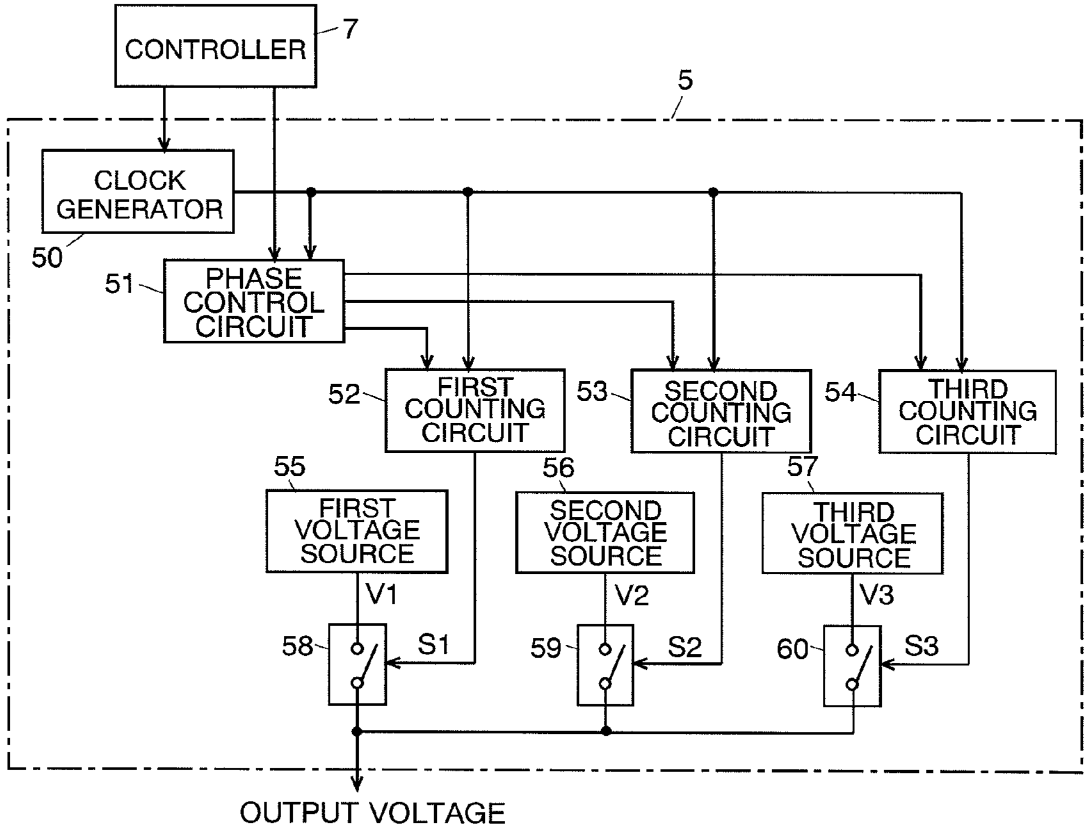
FIG. 2 is a block diagram illustrating a schematic circuit configuration of the main voltage generator in the ion trap time-of-flight mass spectrometer according to the present embodiment.

Each of the main voltage generator 5 and the auxiliary voltage generator 6 generates a predetermined voltage under the control of a controller 7. In this embodiment, the ion trap 2 is what is called a digital ion trap (DIT). As will be described later, the main voltage generator 5 includes a circuit for generating a rectangular-wave radio-frequency voltage by switching on and off direct current voltages of predetermined voltage values. FIG. 2 is a block diagram illustrating a schematic circuit configuration of the main voltage generator 5, and FIG. 3 is a diagram illustrating an example of the timing of expelling ions from the ion trap 2.

In FIG. 2, a clock generator 50 is a circuit for generating a reference clock signal of a predetermined frequency. Each of the first, second and third counting circuits 52, 53, and 54 includes a counter for counting the reference clock signal and a gate circuit for performing a logical operation on the output of the counter. The parameters of the counting circuits, such as the timing for resetting the counter and the count value, can be changed based on the setting from a phase control circuit 51. A first switch 58, which turns on/off the direct current voltage V1 generated by a first voltage source 55, is driven by the output from the first counting circuit 52. A second switch 59, which turns on/off the direct current voltage V2 generated by a second voltage source 56, is driven by the output from the second counting circuit 53. And a third switch 60, which turns on/off the direct current voltage V3 generated by a third voltage source 57, is driven by the output from the third counting circuit 54.

Only one of the first through third switches 58, 59 and 60 is turned on at a time, to provide a voltage corresponding to the activated switch. Therefore, the combination of the patterns of the rectangular-wave signals of the output from the first through third counting circuits 52, 53 and 54 determines the changing pattern of the rectangular radio-frequency voltage that is provided from the main voltage generator 5. The frequency of the rectangular radio-frequency voltage and the timing (or phase) for halting the application of the radio-frequency voltage are set by the phase control circuit 51 in response to an indication from the controller 7 corresponding to an operation through an operation unit 8. In the configuration of this embodiment, the radio-frequency voltage applied to the ring electrode 21 has a rectangular waveform with a high level of V1 and low level of V2. When the application of this radio-frequency voltage is halted, the voltage is V3.

Figure 3:
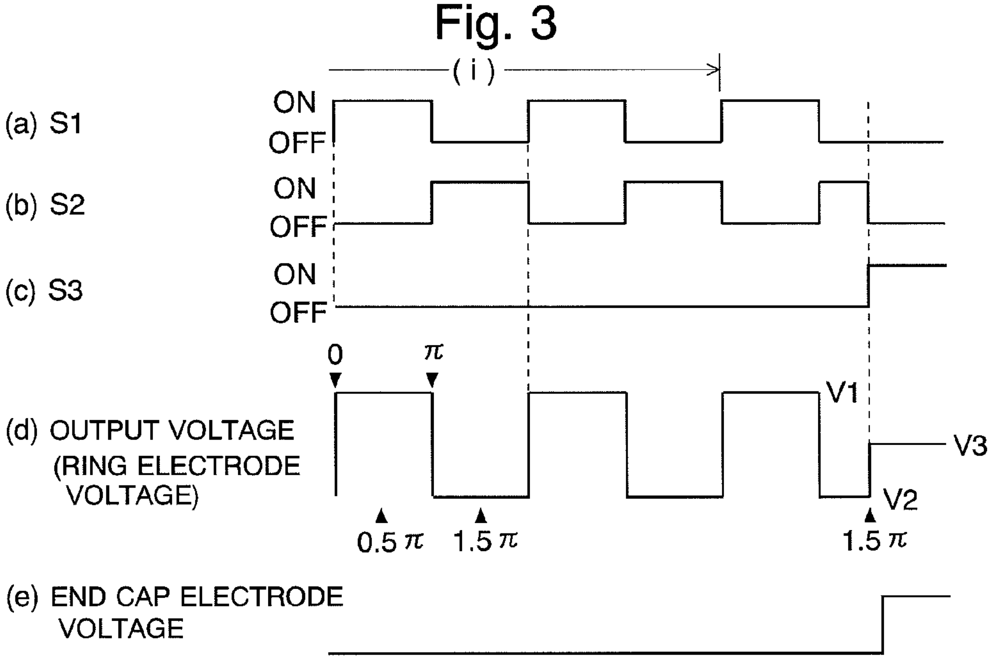
FIG. 3 is a diagram illustrating an example of the timing of expelling ions from the ion trap in the ion trap time-of-flight mass spectrometer according to the present embodiment.

In order to capture the ions inside the ion trap 2, the patterns of the rectangular-wave signals of the output from the first through third counting circuits 52, 53 and 54 are set as indicated by the period (i) in FIGS. 3(*a*), 3(*b*) and 3(*c*). Consequently, a rectangular radio-frequency voltage as illustrated in FIG. 3(*d*) is applied to the ring electrode 21. At this point in time, both of the end cap electrodes 22 and 23 may be grounded, or an appropriate direct current voltage may be applied to both of them. The application of a radio-frequency voltage as just described forms a radio-frequency electric field inside the ion trap 2, and ions inside the ion trap 2 alternately receive an attraction force and repulsion force, to be captured near the center.

In order to collectively expel these captured ions and introduce them into the time-of-flight mass analyzer 3, it is necessary to release the ions from the attraction and repulsion forces produced by the ring electrode 21, and simultaneously or after a slight delay, apply a voltage, between the entrance side end cap electrode 22 and the exit side end cap electrode 23, for providing a kinetic energy to the ions and drawing them through the exit aperture 25 to the outside. Given these factors, in the IT-TOFMS in this embodiment, the output voltage is changed into V3 by the switches 58, 59 and 60 when the voltage is at the phase set by the phase control circuit 51, and almost simultaneously, a predetermined voltage is applied to the end cap electrodes 22 and 23 from the auxiliary voltage generator 6.

Figure 4:
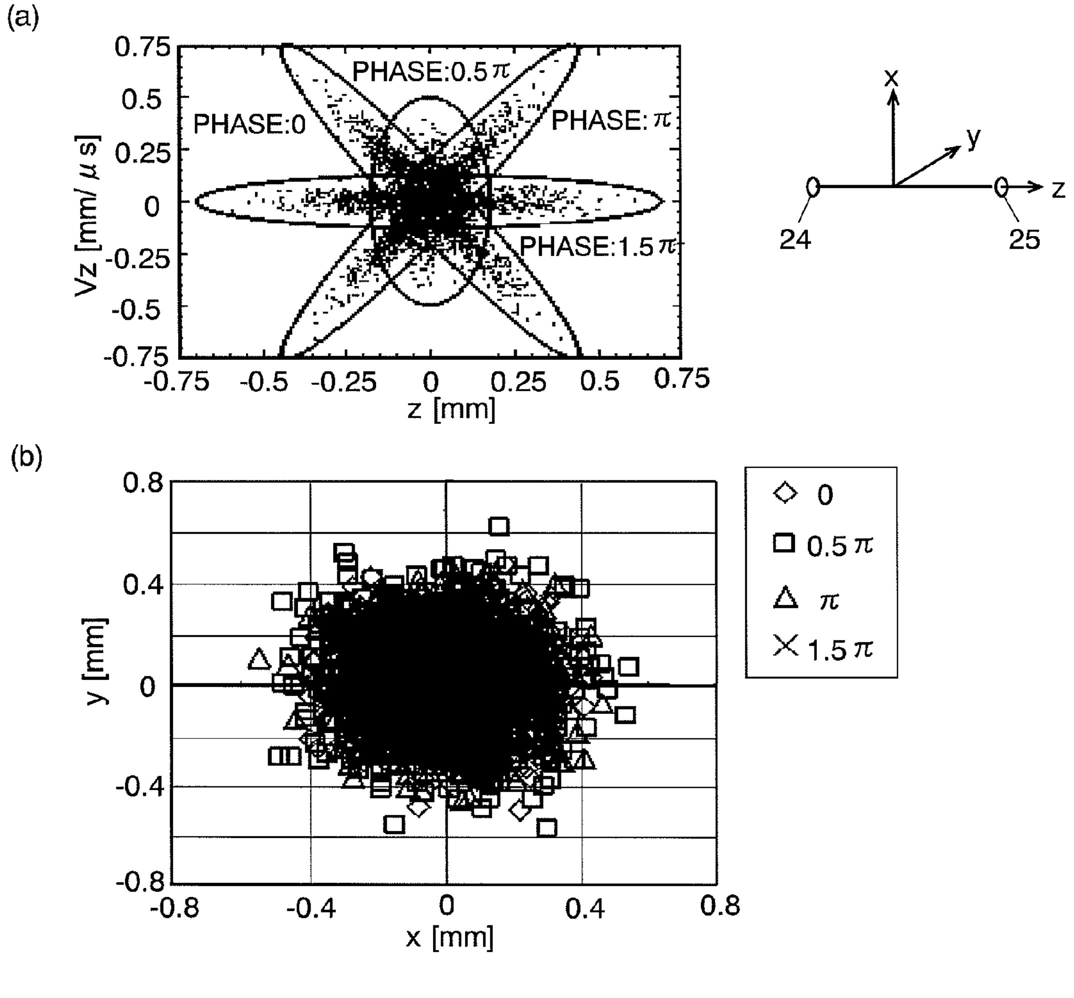
FIG. 4(*a*) is a diagram illustrating the result of a simulation of the relationship between the phase at which the ring voltage is changed and the velocity distribution of ions, and FIG. 4(*b*) is a diagram illustrating the result of a simulation of the relationship between the phase at which the ring voltage is changed and the spatial distribution of ions.

In this embodiment, the phase at which the output voltage is changed into a constant voltage of V3 from a rectangular-wave voltage of V1/V2 can be selectively set to either 0.5π or 1.5π, in correspondence to an order from an operator through the operation unit 8. The significance of selecting these two phases will be hereinafter explained. FIG. 4 is a diagram illustrating a simulation result by a computer: FIG. 4(*a*) is a diagram illustrating the relationship between the phase at which the ring voltage is changed and the velocity distribution of ions, and FIG. 4(*b*) is a diagram illustrating the relationship between the phase at which the ring voltage is changed and the spatial distribution of ions.

In FIG. 4(*a*), the horizontal axis shows the positional distribution of ions in the z-axis direction (or the ion-introduction direction into the ion trap 2 and the ion-expelling direction from the ion trap 2) at the phases of 0π, 0.5π, π, and 1.5π, and the vertical axis shows the velocity distribution that the ions have at each phase. This diagram shows that the velocity spread of the ions in the z-axis direction is minimized at the phase of 1.5π. On the other hand, in FIG. 4(*b*), the horizontal axis shows the x-axis direction, and the vertical axis shows the y-axis direction, both axes being perpendicular to the z-axis. This diagram shows that the spatial spread of the ions is minimized at the phase of 1.5π in both the x-axis direction and the y-axis direction.

Therefore, if the radio-frequency voltage applied to the ring electrode 21 is changed into V3 when the phase thereof is 1.5π so that ions should be expelled from the ion trap 2, the ion's initial velocity before an analysis will have a minimum impact on the flight time. This can suppress the variation of flight times for ions having the same mass, and the mass resolution and mass accuracy can be improved. In addition, since the spatial spread of the ions in the x-axis direction and y-axis direction at the moment of expelling ions is small, the passage efficiency of ions at the exit aperture 25 becomes excellent, which assures a sufficient amount of ions to be introduced into the time-of-flight mass analyzer 3 so that the detection sensitivity can be enhanced.

However, as can be understood from FIG. 4(*a*), the ions' spread in the z-axis direction is large at the phase of 1.5π. This signifies that the ions are significantly spread when they begin to be expelled, and also signifies that a velocity spread might occur due to the difference in the electric potentials of the accelerating electric field, depending on the position in the z-axis direction. However, it is generally known that, when the time-of-flight mass analyzer 3 is operated in the reflectron mode, the aforementioned factor of spread is corrected in returning the ions and the influence thereof is alleviated. Therefore, in the reflectron mode, it is preferable that the phase at which the ions are expelled is set to be 1.5π, from both viewpoints of enhancing the mass resolution and mass accuracy, and enhancing the detection sensitivity.

On the other hand, when the time-of-flight mass analyzer 3 is operated in the linear mode, such a correction effect as previously described cannot be expected, differently from the reflectron mode. If the phase at which the ions are expelled is 0.5π, the spread in the z-axis direction at the moment of expelling the ions is minimized. Simultaneously, the variation of velocities becomes significantly small compared to the case where the phase is 0π or π, although not as small as in the case of the phase of 1.5π. Given this factor, in the linear mode, it is preferable that the phase at which the ions are expelled is set to be 1.5π, from the viewpoint of enhancing the mass resolution and mass accuracy. However, this has a disadvantage in the detection sensitivity since the passage efficiency of ions at the exit aperture 25 is not necessarily high due to the large spatial spread in the x-axis direction and y-axis direction.

If, as described previously, an operator indicates an appropriate phase through the operation unit 8 in accordance with whether the time-of-flight mass analyzer 3 is operated in the linear mode or reflectron mode, ions will be expelled from the ion trap 2 at the timing appropriate for each operation mode and supplied to the mass analyzer. It is also possible to design the present system so that the appropriate phase, i.e. 0.5π for the linear mode and 1.5π for the reflectron mode, is automatically set in accordance with the selection of the linear or reflectron mode without an instruction from an operator.

EXAMPLE

An experiment using the IT-TOFMS of the embodiment as illustrated in FIG. 1 has been conducted to confirm that it is appropriate that the phase at which the ions are expelled is set to be 1.5π in the reflectron mode as previously described. In this experiment, an electrospray ionization (ESI) method was used as the ionization method in the ionization unit 1, and the time-of-flight mass analyzer 3 was operated in the reflectron mode. As a sample to be analyzed, angiotensin II (amino-acid sequence=[DRVYIHPF], m/z: 1046.5) was used.

Figure 5:
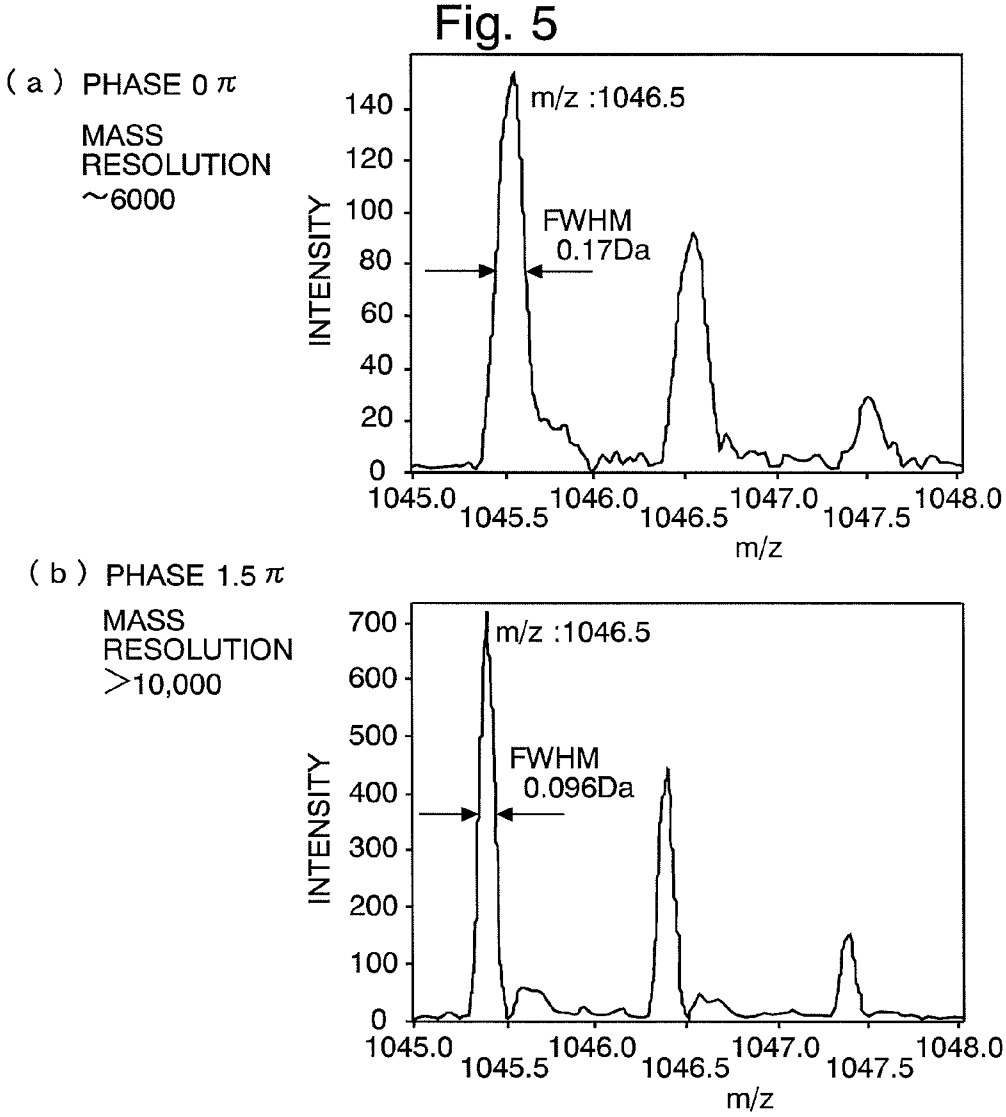
FIG. 5 illustrates the result of an actual measurement of the mass spectrum adjacent to the mass of a monovalent ion of angiotensin II: (a) is a mass spectrum for the phase of 0π, and (b) is a mass spectrum for the phase of 1.5π.

FIG. 5 illustrates the result of an actual measurement of the mass spectrum adjacent to the mass of a monovalent ion of angiotensin II: (a) illustrates a mass spectrum with the phase of 0π, and (b) illustrates a mass spectrum with the phase of 1.5π. Although the peak of the monovalent ion of angiotensin II appears in both spectra, the full width at half maximum (FWHM) of these peaks significantly differ: (a) approximately 0.17 Da, and (b) approximately 0.096 Da. The fact that the masses of these peak tops do not precisely fall on the m/z of the monovalent ion is a matter of calibration and can be ignored in the present discussion.

Mass resolution in a mass analysis can be obtained by M/Δm, where M is the mass of a target ion, and Δm is the full width at half maximum of its peak. Using this, the mass resolution computed from the full width at half maximum is approximately 6000 for the phase of 0π and approximately 10000 for the phase of 1.5π. Therefore, it is understood that in the case of expelling ions at a phase of 1.5π, the mass resolution can be approximately 1.8 times as high as the levels achieved in the case with the phase of 0π.

Figure 6:
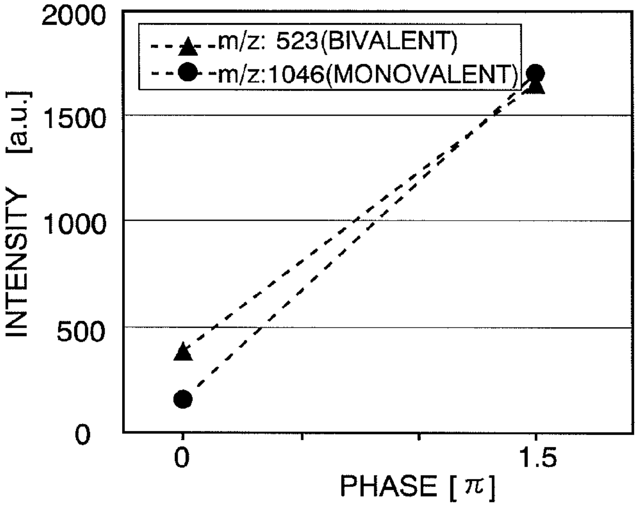
FIG. 6 illustrates the result of an actual measurement of the peak intensity of a monovalent ion and bivalent ion of angiotensin II.

FIG. 6 illustrates the result of an actual measurement of the peak intensity of a monovalent ion and bivalent ion of angiotensin II. This figure shows that, for every ion, approximately a few times higher signal intensity can be obtained in the case with the phase of 1.5π than in the case with the phase of 0π. That is, a high detection sensitivity can be achieved at the phase of 1.5π regardless of the magnitude of m/z. The aforementioned results demonstrate an experimental confirmation that, in the reflectron mode, a detection with high mass resolution and high sensitivity can be performed if the phase at which the voltage is changed for expelling ions from the ion trap is set to be 1.5π. This agrees with the discussion based on the aforementioned simulation results.

It should be noted that the embodiment described thus far is an example and it is evident that any modification, adjustment, and addition appropriately made in accordance with the spirit of the present invention will be included in the scope of the claims of the present patent application. For example, although the ion trap in the aforementioned embodiment is a three-dimensional quadrupole composed of a ring electrode and two end cap electrodes, the present invention can be applied to what is called a linear ion trap composed of multipole (e.g. quadrupole) rods and a pair of end cap electrodes provided at both open end faces thereof.

The invention claimed is:

1. An ion trap time-of-flight mass spectrometer which includes an ion trap for capturing ions by an ion-capturing electric field formed in a space surrounded by a plurality of electrodes and a time-of-flight mass analyzer for mass separation and detection of ions which have been expelled from the ion trap, comprising:

a) a main voltage generator for applying a rectangular-wave radio-frequency voltage to at least one electrode among the plurality of electrodes in order to form the ion-capturing electric field;

b) an auxiliary voltage generator for applying a voltage to at least one electrode, other than the aforementioned one electrode, among the plurality of electrodes in order to expel ions from the ion trap;

c) an operation unit that allows an operator to set a predetermined phase at which the rectangular-wave radio-frequency voltage is set to a constant voltage value; and d) a controller for controlling the main voltage generator in such a manner as to change the voltage into the constant voltage value at a timing when the rectangular-wave radio-frequency voltage is at the predetermined phase, and for controlling the auxiliary voltage generator in such a manner as to apply a voltage for expelling ions simultaneously with or later than the timing, in order to collectively expel ions in a state where the ions are captured in the ion trap by the ion-capturing electric field;

wherein the predetermined phase at which the rectangular-wave radio-frequency voltage is changed into the constant voltage value can be selected continuously or from a plurality of steps.

2. The ion trap time-of-flight mass spectrometer according to claim 1, wherein the predetermined phase can be set to a phase at which a velocity spread of the ions in the ion trap least influences a spread of flight times in the time-of-flight mass analyzer.

3. The ion trap time-of-flight mass spectrometer according to claim 2, wherein:

the ion trap comprises: a ring electrode to which the rectangular-wave radio-frequency voltage for capturing ions is applied; and a pair of end cap electrodes, placed across the ring electrode, to which the voltage for expelling ions is applied;

a duty ratio of the rectangular-wave radio-frequency voltage is 50%; and the predetermined phase is 1.5π.

4. The ion trap time-of-flight mass spectrometer according to claim 1, wherein the predetermined phase can be set to a phase at which a spatial spread of the ions at the moment of expelling the ions from the ion trap is minimized.

5. The ion trap time-of-flight mass spectrometer according to claim 4, wherein:

the ion trap comprises: a ring electrode to which the rectangular-wave radio-frequency voltage for capturing ions is applied; and a pair of end cap electrodes, placed across the ring electrode, to which the voltage for expelling ions is applied;

a duty ratio of the rectangular-wave radio-frequency voltage is 50%; and the predetermined phase is 1.5π.

6. The ion trap time-of-flight mass spectrometer according to claim 1, wherein the predetermined phase can be set to a phase at which a velocity spread of the ions, which is generated due to a spatial spread of the ions in the ion trap when the ions are accelerated to be introduced into the time-of-flight mass analyzer, is minimized.

7. The ion trap time-of-flight mass spectrometer according to claim 6, wherein:

the ion trap comprises: a ring electrode to which the rectangular-wave radio-frequency voltage for capturing ions is applied; and a pair of end cap electrodes, placed across the ring electrode, to which the voltage for expelling ions is applied;

a duty ratio of the rectangular-wave radio-frequency voltage is 50%; and the predetermined phase is 0.5π.

8. The ion trap time-of-flight mass spectrometer according to claim 1, wherein an operation mode of the time-of-flight mass analyzer can switch between a linear mode and a reflectron mode, and the predetermined phase can be changed in accordance with the switching of the operation mode.

9. The ion trap time-of-flight mass spectrometer according to claim 8, wherein:

the ion trap comprises: a ring electrode to which the rectangular-wave radio-frequency voltage for capturing ions is applied; and a pair of end cap electrodes, placed across the ring electrode, to which the voltage for expelling ions is applied;

a duty ratio of the rectangular-wave radio-frequency voltage is 50%; and the predetermined phase is 1.5π when the operation mode is the reflectron mode, and the predetermined phase is 0.5π when the operation mode is the linear mode.

* * * * *